Feb. 7, 1961  K. SCHMIDT  2,971,110
METAL VAPOR LAMPS
Filed Aug. 26, 1959
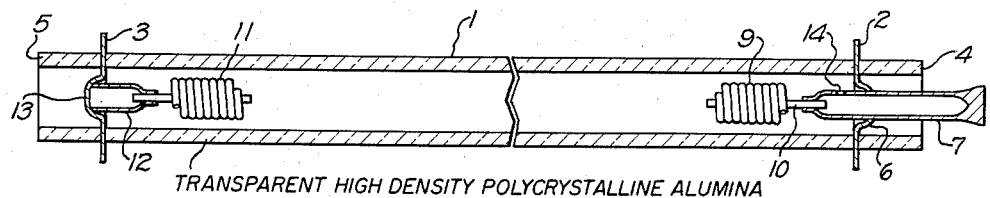
Fig. 1.
TRANSPARENT HIGH DENSITY POLYCRYSTALLINE ALUMINA
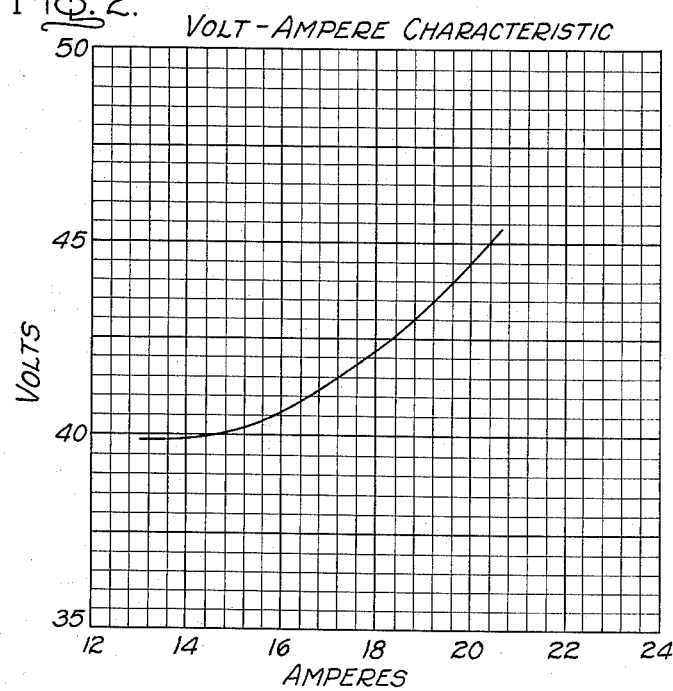
Fig. 2. VOLT-AMPERE CHARACTERISTIC
CESIUM FILLING AT 100MM. OF HG. PRESSURE
Inventor:
Kurt Schmidt
by Ernest W. Rogers
His Attorney United States Patent Office 2,971,110
Patented Feb. 7, 1961

2,971,110

METAL VAPOR LAMPS

Kurt Schmidt, Cleveland, Ohio, assignor to General Electric Company, a corporation of New York Filed Aug. 26, 1959, Ser. No. 836,200

8 Claims. (Cl. 313—221)

This invention relates to metal vapor lamps generally and more particularly to such lamps using a ceramic envelope of high alumina content.

In the metal vapor lamps made hitherto, the vapors of mercury and sodium have been generally used. It has also been proposed to use the vapors of cadmium and zinc, and the alkali metals potassium and cesium. The principal limiting factor in lamps using the vapors of the alkali metals of group 1A, that is sodium, potassium, rubidium and cesium, has generally been the inability of the envelope material to withstand the attack of the metal vapors at the temperatures required for efficient operation. These metal vapors attack glass and quartz and cause rapid blackening at the temperatures at which the envelopes must be operated to achieve substantial light output. In particular, the spectrum of cesium, under suitable conditions of excitation, lies in the visible and infrared with a very strong continuum in the visible, and for that reason would be most useful. However cesium attacks glass and quartz very strongly and at a temperature of a few hundred degrees centigrade, for instance 500° C., causes a quartz envelope to blacken in a few minutes.

In some metal vapor lamps a limiting factor has been the inability of the electrodes or seals to withstand the temperatures required for efficient operation. This applies particularly to quartz high-pressure vapor lamps where the electrodes and the ends of the lamps including the seals must be able to withstand relatively high temperatures as otherwise the condensation of mercury in the cooler regions will reduce the vapor pressure with consequent deterioration of operating characteristics. The limiting factor in regards to seal temperature is generally the onset of oxidation of the tungsten or molybdenum lead-in conductors. Of course the temperature range may be extended by enclosing the lamp or arc tube in a non-oxidizing or inert atmosphere by means of an outer envelope or jacket, but this adds to the cost and complexity of the lamp.

The general object of the invention is to provide new and improved metal vapor lamps operating at high efficiency.

A more specific object of the invention is to provide a cesium vapor lamp operating at high efficiency and with a desirable spectrum having a continuum in the visible. Further it is desired to provide such a lamp having good maintenance, that is long life without envelope blackening, and which is simple in design and relatively economical to construct.

In accordance with the invention, I have discovered that a lamp combining an envelope of sintered transparent high density polycrystalline alumina with a discharge medium of metal vapors quite unexpectedly produces results and advantages much beyond what might be expected from the mere fact that such high density alumina can withstand a higher temperature than quartz. I have discovered that the sintered alumina envelope withstands vapors of the alkali metals sodium, potassium, rubidium and cesium, without blackening for long periods of time even at temperatures as high as 1600° C. It can also withstand as well or even better the vapors of the alkali earth metals calcium, strontium and barium, and also cadmium, zinc and thallium.

According to another feature of the invention, I have discovered that in the case of a cesium vapor lamp, the ability of the electrodes and seals to withstand high temperatures does not in this particular combination operate as a limiting factor. Although it is desirable to have a very high temperature in the discharge, and the envelope immediately about the discharge may operate at temperatures from 1000 to 1600° C., such high temperatures are not required at the seals. In fact and quite unexpectedly maximum efficiency is obtained with relatively low pressures of cesium vapor and condensation of cesium either at the seals or in an external chamber projecting beyond the seals and maintained at an even lower temperature is desirable.

For further objects and advantages and for a better understanding of the invention, attention is now directed to the following description of a preferred embodiment taken in conjunction with the accompanying drawing. The features of the invention believed to be novel will be more particularly pointed out in the appended claims.

In the drawing:

Fig. 1 is a sectioned view of a cesium vapor lamp with a sintered polycrystalline alumina envelope embodying the invention.

Fig. 2 illustrates certain operating characteristics of the lamp of Fig. 1.

Referring to the drawing, the lamp comprises an envelope 1 of ceramic tubing of sintered transparent polycrystalline alumina. The tubing material has a very high alumina content, in excess of 99.5% $Al_2O_3$ and though translucent, rather than clear like glass, has exceedingly good light transmittance, in excess of 95%. Metal caps or closure members 2, 3 consisting of a nickel chromium iron alloy having a high temperature melting point and a coefficient of expansion close to that of the alumina are brazed to the ends of the alumina tube using thin titanium washers to metalize the ends of the tube in order to bond the discs thereto. Alumina back-up rings 4, 5, in effect short sections of tubing of the same diameter and wall thickness as the tubing 1, are brazed to the outer faces of the caps 2, 3, again through the use of titanium washers to metalize the surface of the ceramic rings. The purpose of the back-up rings is to balance the strains set up between the caps 2, 3 and the alumina parts to which they are brazed throughout the temperature range to which the ends of the lamp are subjected in operation.

The brazing of the end caps is done in a vacuum or in a reducing or inert atmosphere. For instance to braze the end cap 2 and back-up ring 4 together and onto the end of the tubing 1, the parts are placed in a vacuum furnace and assembled in the following order: tubing 1, a first titanium washer, the nickel chromium iron alloy 2, a second titanium washer, and then the back-up ring 4. The parts are pressed together and the furnace either evacuated or filled with a reducing or inert atmosphere and the temperature raised to approximately 955° C. Reference may be made to the copending application Serial No. 836,201 of William C. Louden and Elmer Homonnay, filed of even date herewith, entitled "Metal-to-Ceramic Seal" for details of a suitable seal construction and the method of making it.

Cap 2 at one end of the lamp is centrally perforated through an outwardly projecting embossment 6 through which is passed a stainless steel tube 7. The tube 7 is brazed to the cap to make a hermetic seal and supports on its inner end a cathode 9 consisting of a doublewound tungsten wire coil with the interstices filled with activating material in the form of alkaline earth oxides including barium oxide. The tungsten coils forming the cathode are wound over a tungsten shank 10 which is welded in the end of the stainless steel tube 7. Electrode 11 at the other end of the tube is supported from a short length of stainless steel tubing 12 welded into the outwardly projecting embossment 13 of end cap 3, no perforation of the end cap or projection of the tube being required at this end of the lamp.

The tube 7 is used to evacuate the lamp and to introduce the ionizable medium therein including an inert starting gas such as xenon and a quantity of cesium. The means for introducing the cesium may be a glass capsule with the material sealed inside. This capsule is placed in an expanded extension of the thin-walled tubing 7 (not shown) whose far end is closed off by pinching. The capsule is then broken by squeezing the stainless steel tube at the expanded portion which may then be heated to drive the contents towards the alumina envelope 1. The side aperture 14 permits passage from the stainless steel tube into the alumina envelope.

The tube 7 may then be pinched a second time closer to disc 2 and the expanded portion containing the glass fragments broken off, leaving the lamp as illustrated in the drawing.

By virtue of the low work function of cesium (0.7–1.36 volt) a plain tungsten rod (preferably thoriated) may be used if desired instead of the illustrated electrode.

In accordance with the invention, the length of the projecting pinched-off stainless steel tube 7 serves as a cesium vapor pressure control center and its length is adjusted to attain in operation the necessary temperature for maintaining the cesium vapor within the envelope at an optimum pressure which is less than the saturation pressure for the operating temperature of the central part of the alumina envelope. The central part of the envelope may operate in the range from 1000 to 1600° C. to achieve relatively long life, or even higher if shorter life can be tolerated, up to the melting point of the alumina at about 1925° C. The cesium vapor in operation may be in the pressure range from 10 to 800 millimeters of mercury which is achieved by appendix temperatures in the range of 350 to 700° C. The volume loading is in the range of 200 to 900 watts per cubic centimeter whereby a luminous efficiency in the range of 35 to 50 lumens per watt may be achieved.

As an example of the foregoing, a lamp constructed as illustrated in the drawing utilized alumina tubing of 6 millimeters internal diameter with an overall length of 10 centimeters and a distance between electrode tips of approximately 5.5 centimeters, the active volume of the envelope being approximately 1.55 cc. The appendix length, that is the length of stainless steel tube 7 projecting beyond the end cap 2 was approximately 1 centimeter. The lamp was filled with an inert starting gas (xenon) at a room pressure of 20 millimeters of mercury, and a quantity of cesium in excess of that vaporized during operation. This lamp operated on A.C. with an arc drop of 42.1 volts and an arc current of 18.1 amperes, resulting in a loading of 700 watts, the volume loading being approximately 450 watts per cc. Under these conditions, the envelope temperature midway between the electrodes was approximately 1000° C. and the temperature of the appendix 7 was approximately 500° C., the cesium vapor pressure corresponding thereto being approximately 100 millimeters. The lamp operated with a positive volt ampere characteristic as illustrated in Fig. 2 and an efficiency of approximately 45 lumens per watt. The efficiency was determined to be at a maximum with an appendix temperature in the range of 400 to 600° C. with the corresponding vapor pressure of cesium being from 20 to 350 millimeters of mercury.

According to a variant of the invention an alumina envelope-cesium vapor lamp may be provided with a closely controlled quantity of cesium which is totally vaporized during operation. In such case control of the temperature of the ends of the lamp is not necessary and the vapor pressure regulating appendix may be eliminated. In such case the lamp operates with constant vapor density rather than constant vapor pressure, and the cesium vapor is normally undersaturated in operation. The volume loading and vapor pressure remain in the ranges previously stated.

One of the unexpected advantages of a lamp in accordance with the invention is that optimum efficiency is found to exist at a relatively low cesium vapor pressure with the result that the ends of the lamp need not operate at nearly as high a temperature as the central portion of the envelope where the discharge takes place. The temperature of the end caps was measured and found to be in the range of 400 to 800° C. This of course is a higher temperature than the appendix temperature so that the vapor pressure of the cesium is not affected thereby. Furthermore the seal or end cap temperature is low enough that the lamp may be operated in air and has no need for an outer envelope or jacket to enclose the lamp within a non-oxidizing or inert atmosphere in order to prevent oxidation of the seal. Thus the combination of the alumina envelope and the cesium vapor permits realizing to the full the ability of the alumina to withstand a very high operating temperature while avoiding the limitations which the relatively low temperatures at which the end caps or seals must be maintained would otherwise impose.

The foregoing example of the invention is intended as illustrative and not in order to limit the invention thereto except inasmuch as specific limitations may appear in the appended claims.

What I claim as new and desire to secure by Letters Patent of the United States is:

1. An electric discharge lamp comprising a tubular elongated envelope of sintered transparent high density polycrystalline alumina consisting essentially of aluminum oxide and having a melting point not less than 1925° C., said envelope having a pair of electrodes sealed into opposite ends, an ionizable medium including metal vapors sealed within said envelope, said metal vapors being selected from the group comprising the alkali metals sodium, potassium, rubidium and cesium, the alkali earth metals calcium, strontium and barium, and the metals cadmium, zinc and thallium, said envelope operating at a temperature from 1000° C. up to approximately 1925° C.

2. A lamp as defined in claim 1 operating in the temperature range from 1000 to 1600° C. to achieve relatively long life and maintenance.

3. An electric discharge lamp comprising a tubular elongated envelope of sintered transparent high density polycrystalline alumina consisting essentially of aluminum oxide and having a melting point not less than 1925° C., said envelope having a pair of electrodes sealed into opposite ends, an ionizable medium including cesium vapor sealed within said envelope, said envelope operating in the temperature range from 1000° C. up to approximately 1925° C.

4. An electric discharge lamp comprising a tubular elongated envelope of sintered transparent high density polycrystalline alumina consisting essentially of aluminum oxide and having a melting point not less than 1925° C., said envelope having a pair of electrodes sealed into opposite ends, an ionizable medium including cesium vapor sealed within said envelope, said envelope operating in the temperature range from 1000 to 1600° C. with a loading per cubic centimeter in the range of 200 to 900 watts.

5. An electric discharge lamp comprising an elongated tubular envelope of sintered transparent high density polycrystalline alumina consisting essentially of aluminum oxide and having a melting point not less than 1925° C., said envelope having a pair of metal end caps hermetically sealed to opposite ends, electrodes within said envelope attached to said end caps, an ionizable filling within said envelope including cesium vapor, said lamp operating with an arc loading of 200 to 900 watts per cubic centimeter resulting in an envelope temperature about the discharge in the range of 1000 to 1600° C.

6. An electric discharge lamp comprising an elongated tubular envelope of sintered transparent high density polycrystalline alumina consisting essentially of aluminum oxide and having a melting point not less than 1925° C., said envelope having a pair of metal end caps hermetically sealed to opposite ends, electrodes supported within said envelope from said end caps, one of said end caps having a metal tube projecting therethrough forming an appendix external of said envelope, an ionizable filling within said envelope consisting of an inert gas and cesium vapor and a reservoir of cesium within said appendix in communication with said envelope, said lamp operating with an arc loading of 200 to 900 watts per cubic centimeter resulting in an envelope temperature about the discharge in the range of 1000 to 1600° C. and achieving a luminous efficiency of 35 to 50 lumens per watt with a cesium vapor pressure in the range of 10 to 800 millimeters of mercury resulting from an appendix temperature in the range of 350 to 700° C.

7. An electric discharge lamp comprising an elongated tubular envelope of sintered transparent high density polycrystalline alumina consisting essentially of aluminum oxide and having a melting point not less than 1925° C., said envelope having a pair of metal end caps hermetically sealed to opposite ends, electrodes supported within said envelope from said end caps, an ionizable filling within said envelope consisting of an inert gas and a quantity of cesium which is totally vaporized during operation, said lamp operating with an arc loading of 200 to 900 watts per cubic centimeter resulting in an envelope temperature about the discharge in the range of 1000 to 1600° C. and achieving a luminous efficiency of 35 to 50 lumens per watt with a cesium vapor pressure in the range of 10 to 800 millimeters of mercury.

8. An electric discharge lamp comprising an elongated tubular envelope of sintered transparent high density polycrystalline alumina consisting essentially of aluminum oxide and having a melting point not less than 1925° C., said envelope having a pair of metal end caps hermetically sealed to opposite ends, electrodes supported within said envelope from said end caps, one of said end caps having a metal tube projecting therethrough forming an appendix external of said envelope, an ionizable filling within said envelope consisting of xenon and cesium vapor and a reservoir of cesium within said appendix in communication with said envelope, said lamp operating within an arc loading of approximately 450 watts per cubic centimeter resulting in an envelope temperature about the discharge in the range of approximately 1000° C. and achieving a luminous efficiency of approximately 45 lumens per watt with a cesium vapor pressure of approximately 100 millimeters of mercury resulting from an appendix temperature of approximately 500° C.

References Cited in the file of this patent
UNITED STATES PATENTS 2,056,926    Krefft _____ Oct. 6, 1936